(12) United States Patent
Vinogradov et al.

(10) Patent No.: US 11,442,267 B2
(45) Date of Patent: Sep. 13, 2022

(54) OPTICAL ARRANGEMENT FOR WIDE ANGLE IMAGING LENS WITH FRONT ENTRANCE PUPIL

(71) Applicant: ZEBRA TECHNOLOGIES CORPORATION, Lincolnshire, IL (US)

(72) Inventors: Igor Vinogradov, Oakdale, NY (US); Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 302 days.

(21) Appl. No.: 16/775,452

(22) Filed: Jan. 29, 2020

(65) Prior Publication Data
US 2021/0231948 A1    Jul. 29, 2021

(51) Int. Cl.
| | |
|---|---|
| *G02B 27/00* | (2006.01) |
| *G02B 9/06* | (2006.01) |
| *H04N 5/225* | (2006.01) |
| *H04N 5/232* | (2006.01) |
| *G02B 3/04* | (2006.01) |
| *G02B 1/04* | (2006.01) |

(52) U.S. Cl.
CPC ........... *G02B 27/0075* (2013.01); *G02B 9/06* (2013.01); *G02B 27/0025* (2013.01); *H04N 5/2254* (2013.01); *H04N 5/23238* (2013.01); *G02B 1/041* (2013.01); *G02B 3/04* (2013.01)

(58) Field of Classification Search
CPC .. G02B 27/0075; G02B 9/06; G02B 27/0025; G02B 1/041; G02B 3/04; G02B 9/12; G02B 9/34; G02B 9/60; G02B 13/002; G02B 13/004; G02B 13/0045; G02B 13/24; G02B 7/021; H04N 5/2254; H04N 5/23238
See application file for complete search history.

(56) References Cited

U.S. PATENT DOCUMENTS

| | | | |
|---|---|---|---|
| 2013/0128084 A1* | 5/2013 | Vinogradov | G02B 13/006 348/294 |
| 2014/0346230 A1* | 11/2014 | Liu | G02B 13/004 235/454 |
| 2015/0293331 A1* | 10/2015 | Yonezawa | G02B 13/0045 359/714 |

OTHER PUBLICATIONS

Gross et al. "Handbook of Optical Systems", Wiley, vol. 3, pp. 377-379 (Year: 2007).*

* cited by examiner

*Primary Examiner* — Marin Pichler
(74) *Attorney, Agent, or Firm* — Yuri Astvatsaturov

(57) ABSTRACT

A method and apparatus for capturing an image of at least one object appearing in a wide-angle field of view (FOV). A housing has an image sensor and a lens assembly fixedly mounted relative thereto. The lens assembly includes first and second lens groups, and a glass lens. The lens assembly and the image sensor are aligned such that light received within the FOV passes through a front aperture and the base lens assembly and impinges onto the image sensor. The light received from the FOV forms an original image prior to entering the front aperture and the lens assembly. Light from the FOV impinging onto the sensor forms an impinging image.

9 Claims, 3 Drawing Sheets

OPTICAL ARRANGEMENT FOR WIDE ANGLE IMAGING LENS WITH FRONT ENTRANCE PUPIL

BACKGROUND

Barcode and other scanning devices generally capture images within a given field of view (FOV). It is often required that that scanning devices capture images with a wide angle field of view to effectively decode information in a barcode image. Additionally, the demand for portable sensors is increasing which requires the use of smaller sensors further requiring active alignment of the sensors necessitating an air gap between optics and the sensor. Accordingly, portable scanning devices must be capable of functioning with a wide field of view while generating sharp images over a working range.

Barcode or optical readers typically are unable to accommodate powerful (and therefore bulky) magnification or zooming systems due to the compact nature of the device. Further, the barcode or optical reader must be capable of minimizing image degradation while capturing images at a suitably high resolution with a wide field of view. While some systems may address these, and other issues, via a combination of complicated custom optics and electromechanical components which may be coupled with software correction, such systems are fairly complex and costly, and can adversely impact reliability of the device.

Accordingly, there is a need for improved systems, methods, and devices which address these issues.

SUMMARY

In an embodiment, the present invention is an optical assembly for wide angle imaging of an object of interest. The optical assembly comprises a front aperture disposed along an optical axis configured to receive light from the object of interest therethrough along the optical axis; a first lens group disposed along the optical axis relative to the front aperture to receive the light from the object of interest through the front aperture and configured to correct for spherical aberrations of an image projected by the second lens group onto an imaging sensor; a glass lens disposed along the optical axis configured to receive the light from the first lens group and further configured to magnify an image along mutually orthogonal directions generally perpendicular to the optical axis; a second lens group disposed along the optical axis configured to receive the light from the glass lens and further configured to correct for optical field distortions of an image projected by the second lens group; and the imaging sensor being disposed along the optical axis at a back focal distance of the second lens group, and configured to receive the image from the second lens group and to generate an electrical signal indicative of the received image, wherein the back focal distance is equal to or greater than 0.5 millimeters.

In a variation of the current embodiment, the second lens group configured to correct for optical field distortions is configured to correct for at least one of field curvature, astigmatism, coma, or chromatic aberrations. In another variation of the current embodiment, the optical assembly has an effective focal length of approximately 4, and an f-number of greater than 5.

In a variation of the current embodiment, the first lens group comprises a first plastic aspheric lens and a second plastic aspheric lens, the first plastic aspheric lens disposed along the optical axis between the second plastic aspheric lens and the aperture. In a further variation of the current embodiment, the first plastic aspheric lens of the first lens group has a first aspheric surface along the optical axis and a second aspheric surface opposite the first aspheric surface disposed along the optical axis, and wherein the first plastic aspheric lens is formed of a Crown type plastic having a positive optical power, and the second plastic aspheric lens of the first lens group has a first aspheric surface along the optical axis second aspheric surface along the optical axis, and wherein the second plastic aspheric lens is formed of a Flint type material having a negative optical power.

In a variation of the current embodiment, the second lens group comprises a first plastic aspheric lens and a second plastic aspheric lens, the first plastic aspheric lens is disposed along the optical axis between the second plastic aspheric lens and the glass lens. In a further variation of the current embodiment, the first plastic aspheric lens of the second lens group has a first aspheric surface along the optical axis and a second aspheric surface opposite the first aspheric surface disposed along the optical axis, and wherein the first plastic aspheric lens is formed of a Crown type plastic having a positive optical power, and the second plastic substantially aspheric lens of the first lens group has a first aspheric surface along the optical axis second aspheric surface along the optical axis, and wherein the second plastic aspheric lens is formed of a Flint type material having a negative optical power.

In a variation of the current embodiment, the glass lens has a first substantially flat surface and a second spherical surface opposite the first flat surface disposed along the optical axis, and wherein the glass lens is a Crown type glass having a positive optical power.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
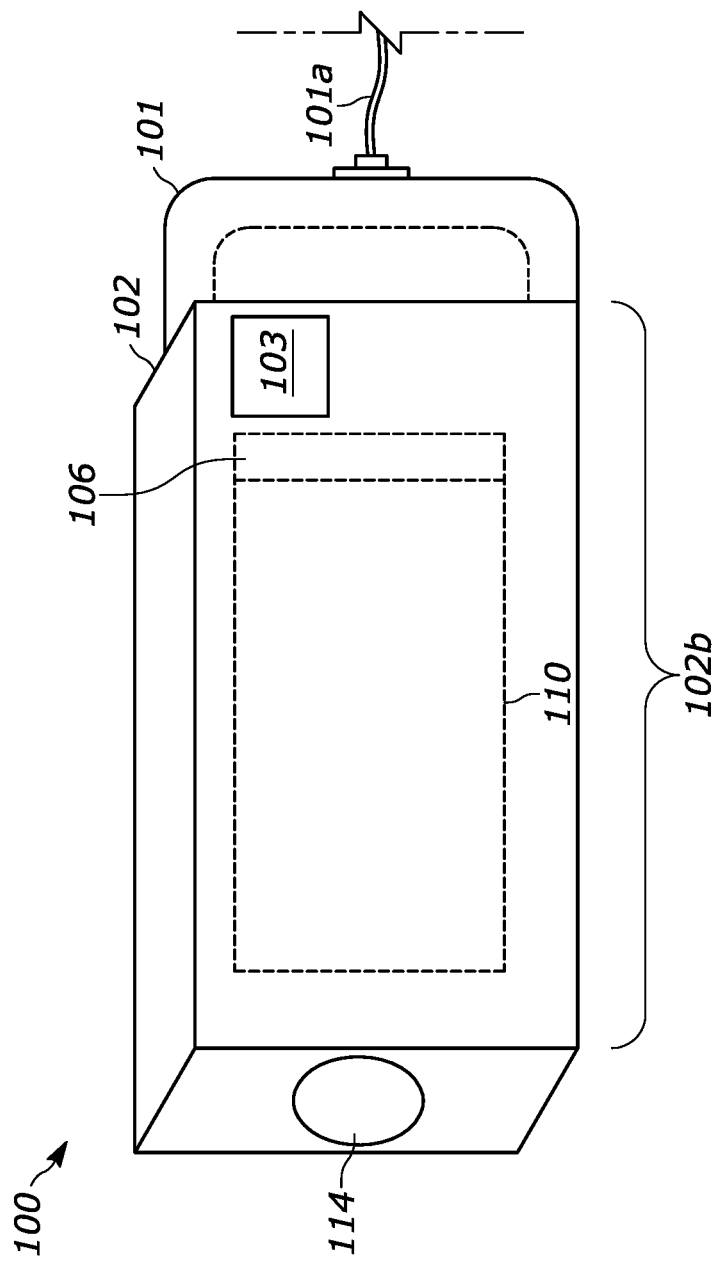
FIG. 1 is a schematic side elevation view of a barcode or optical reading device having a imaging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Portable high-performance barcode readers employ small imaging sensors to maintain small form factors. For example a typical imaging sensor employed in high-performance barcode readers has an imaging sensor rectangular area of around 4 by 3 millimeters with sensor pixels areas of approximately 3 microns. Some high-performance compact barcode readers require wide angle fields of view (FOVs) (e.g., greater than 40 degrees) in addition to small form factor imaging sensors. Additionally, systems that employ custom aspheric glass lenses are not easily mass produced due to a lack of the ability to mass produce aspheric glass lenses. The current disclosure describes a wide field of view optical assembly with that employs two lens groups and a glass lens that improves upon current technologies by: (i) improving the correction of optical aberrations of images, (ii) enables mass production of the assembly due to the types of lenses employed, and (iii) provides a back focal distance of greater than 0.5 millimeters required for active alignment of small sensors.

In an exemplary implementation, the present application provides an optical assembly capturing a wide angle image of at least one object appearing in a field of view (FOV). In various embodiments of the present disclosure, the optical assembly includes a front aperture disposed along an optical axis configured to receive light from the object of interest therethrough along the optical axis. The optical assembly further includes multiple lens groups and a glass lens disposed along the optical axis. The first lens group is disposed along the optical axis relative to the front aperture to receive the light from the object of interest through the front aperture and the first lens group is configured to correct for spherical aberrations of an image projected by the first lens group. The glass lens is disposed along the optical axis and the glass lens is configured to receive the light from the first lens group and further configured to magnify an image along mutually orthogonal directions generally perpendicular to the optical axis. The second lens group is disposed along the optical axis and the second lens group is configured to receive the light from the glass lens and further configured to correct for optical field distortions of an image projected by the second lens group. The optical assembly further includes an imaging sensor disposed along the optical axis approximately at a back focal distance of the second lens group, and the imaging sensor is configured to receive the image from the second lens group and to generate an electrical signal indicative of the received image. In embodiments the back focal distance is equal to or greater than 0.5 millimeters.

Figure 2:
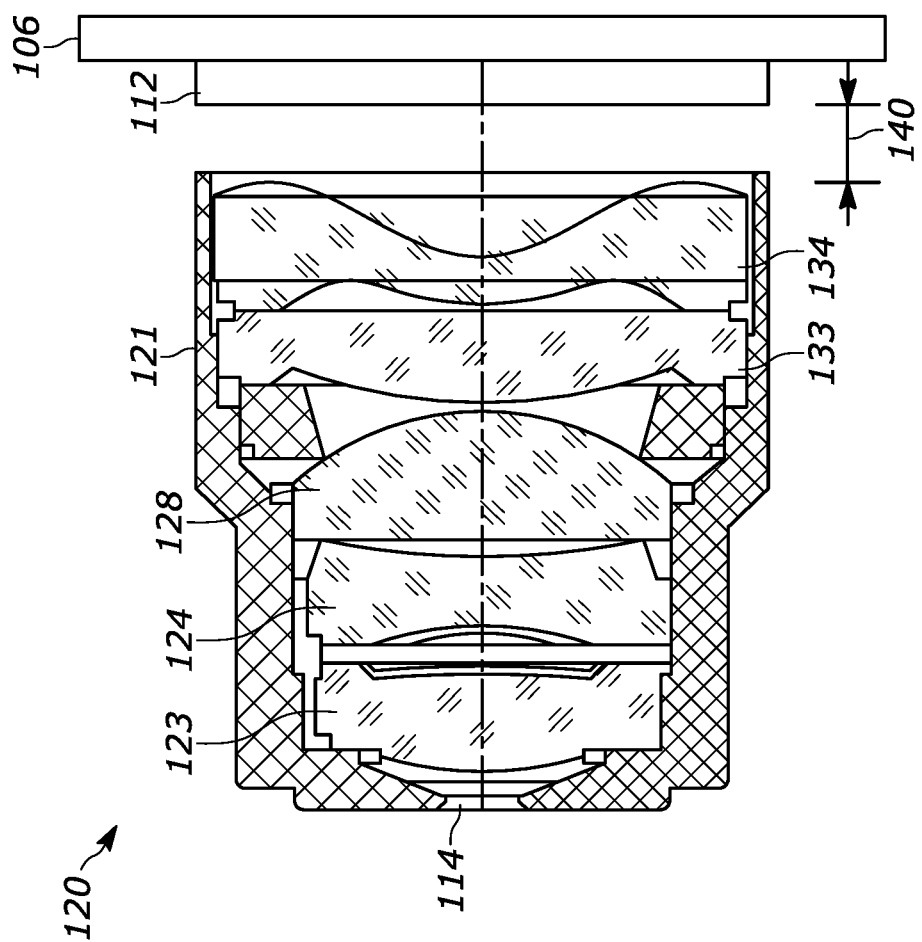
FIG. 2 is a cross-sectional side view of the barcode or optical reading device of FIG. 1 in accordance with some embodiments.
Figure 3:
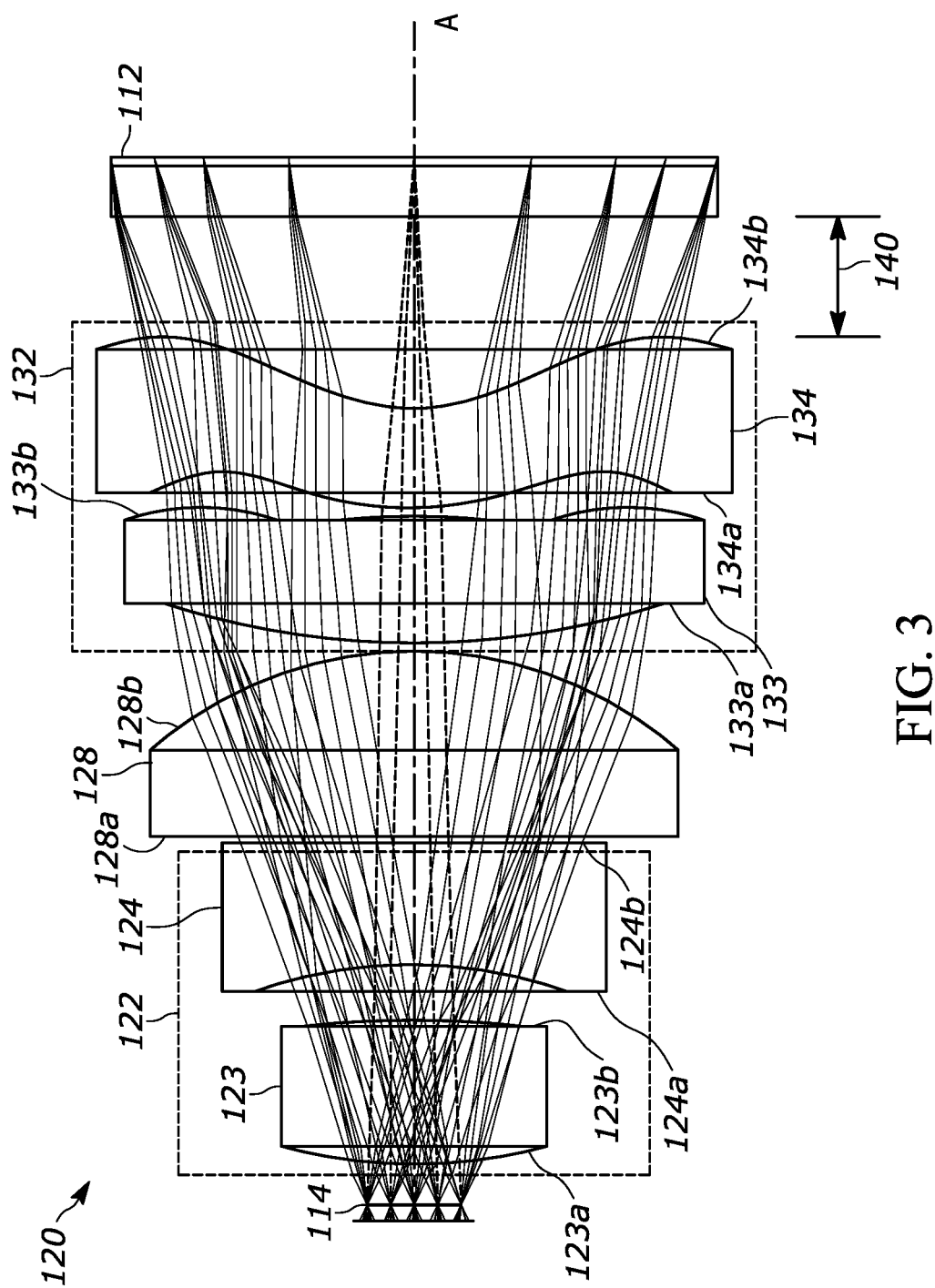
FIG. 3 is a cross-sectional side view of an optical assembly of the barcode or optical reading device of FIGS. 1 and 2 in accordance with some embodiments.

A first embodiment of an imaging-based bar code reader is shown schematically in FIGS. 1-3. The barcode or optical reading device 100 includes a housing 102, an imaging system 110 at least partially disposed within the housing 102 that includes an imaging camera assembly. Specifically, the imaging system 110 includes an image sensor 112, and a lens assembly 120. The device 100 may be adapted to be inserted into a docking station 101 which, in some examples, may include an AC power source 101*a* to provide power for the device 100. The device 100 may further include an onboard power supply 103 such as a battery, and a printed circuit board 106 which may accommodate a memory and a controller that controls operation of the imaging system 110. In embodiments, the device 100 may include a trigger (not shown in the illustration) that is used to activate the imaging system 110 to capture or scan a barcode. The device 100 may include any number of additional components such as decoding systems, processors, and/or circuitry coupled to the circuit board 106 to assist in operation of the device 100.

The housing 102 includes a forward or reading head portion 102*b* which supports the imaging system 110 within an interior region of the housing 102. The imaging system 110 may, but does not have to be, modular as it may be removed or inserted as a unit into the devices, allowing the ready substitution of imaging systems 110 having different imaging characteristics (e.g., camera assemblies having different focal distances, working ranges, and FOVs) for use in different devices and systems. In some examples, the field of view may be static.

The image sensor 112 may have a plurality of photosensitive elements forming a substantially flat surface and may be fixedly mounted relative to the housing 102 using any number of components and/or approaches. The image sensor 112 further has a defined central imaging axis A that is normal to the substantially flat surface. In some embodiments, the imaging axis A is coaxial with a central axis of the lens assembly 120. The lens assembly 120 may also be fixedly mounted relative to the housing 102 using any number of components and/or approaches. In the illustrated embodiment, the lens assembly 120 is positioned between a front aperture 114 and the image sensor 112. The front aperture 114 blocks light from objects outside of the field of view which reduces imaging problems due to stray light from objects other than the target object. Additionally, the front aperture 114 in conjunction with a plurality of lenses (i.e., described further herein in reference to lenses of a first lens group, a glass lens, and lenses of a second lens group) allows for the image to form correctly on the imaging sensor 112. In embodiments the housing 102 may include additional elements such as an illumination system configured to illuminate a target object for imaging. The illumination system may include a light emitting diode, laser diode, black body radiation source, or another illumination source. Additionally, the illumination system may include optics for dispersing or focusing optical radiation for illumination of the target object. The illumination system may be housed inside of the housing 102, may attach to the external surfaces of the housing 102, or may be a separate device or component configured to illuminate the target object for capturing an image by the optical reading device 100.

As best seen in FIGS. 2 and 3, the lens assembly 120 includes a number of lens elements disposed in a lens holder 121, specifically the lens assembly 120 includes a first lens group 122, a glass lens 128, and a second lens group 132. The first lens group 122 includes a first lens 123 and a second lens 124, and the first lens group 122 is configured to correct for spherical aberrations of an image projected by the first lens group 122. The first lens 123 is a plastic aspheric lens with a first aspheric surface 123*a* and a second aspheric surface 123*b* and the first lens 123 is configured to receive light from the front aperture 114. The first lens 123 is made out of a Crown type plastic with an index of refraction of approximately 1.53 and an Abbe value of approximately 56. Additionally, the first lens 123 of the first lens group 122 has an overall positive optical power. The second lens 124 of the first lens group 122 is a plastic aspheric lens with a first aspheric surface 124*a* and a second aspheric surface 124*b* and the second lens 124 is configured to receive light from the first lens 123 of the first lens group 122. The second lens 124 is made out of a Flint type plastic with an index of refraction of approximately 1.61 and an Abbe value of approximately 27. Additionally, the second lens 124 of the first lens group 122 has an overall negative optical power.

The glass lens 128 is positioned along the optical axis A and configured to receive light from the first lens group 122. The glass lens 128 is made out of a Crown type glass with an index of refraction of approximately 1.73 and an Abbe value of approximately 55. The glass lens has a positive optical power. In embodiments the glass lens 128 has a substantially flat first surface 128*a* and a spherical second surface 128*b* opposite the substantially flat first surface 128*a*, with the spherical second surface 128*b* facing in the direction towards the imaging sensor 112. The glass lens 128 provides the main optical power of the imaging system 110 and transforms the light from the first lens group 122 and provides the transformed light to the second lens group 132. The glass lens 128 may bear a majority of the optical power of the lens assembly 120. Generally, the index of refraction of glass material does not vary with temperature significantly for the intended application in the wide angle imaging assembly, and thus can provide a nearly constant focal distance of the base lens assembly 120 over wide range of temperatures. In embodiments, the glass lens 128 may be a plastic lens, which may provide less thermal stability causing focal length shifts, and other image distortions at various temperatures of the optical assembly.

The second lens group 132 includes a first lens 133 and a second lens 134, and the second lens group 132 is position along the optical axis A configured to receive light from the glass lens 128 and to correct for optical field curvature, distortion, coma, and chromatic aberrations. The first lens 133 of the second lens group 132 is a plastic aspheric lens with a first aspheric surface 133*a* and a second aspheric surface 133*b* and the first lens 133 is configured to receive light from the glass lens 128. The first lens 133 is made out of a Crown type plastic with an index of refraction of approximately 1.53 and an Abbe value of approximately 56. Additionally, the first lens 133 of the second lens group 132 has an overall positive optical power. The second lens 134 of the second lens group 132 is a plastic aspheric lens with a first aspheric surface 134*a* and a second aspheric surface 134*b* and the second lens 134 is configured to receive light from the first lens 133 of the second lens group 132. The second lens 134 is made out of a Flint type plastic with an index of refraction of approximately 1.64 and an Abbe value of approximately 24. Additionally, the second lens 124 of the first lens group 122 has an overall negative optical power. Further, at least a portion of the first surface 134*a* of the second lens 134 is both concave and convex, and at least a portion of the second surface 134*b* is both concave and convex. In embodiments, the second lens group is configured to correct for at least one of optical field curvature, astigmatism, coma, chromatic aberrations, and any other off axis aberrations.

The lens assembly 120 defines an optical axis that is approximately collinear with the central imaging axis 112 of the image sensor 112. The lens assembly 120 and the image sensor 112 are aligned such that light received from the field of view passes through the aperture 114, the first surface 123*a* and the second surface 123*b* of the first lens 123 of the first lens group 122, the first surface 124*a* and the second surface 124*b* of the second lens 124 of the first lens group 122, the first surface 128*a* and the second surface 128*b* of the glass lens 128, the first surface 133*a* and the second surface 133*b* of the first lens 133 of the second lens group 132, the first surface 134*a* and the second surface 134*b* of the second lens 134 of the second lens group 132, and ultimately impinges onto the image sensor 112.

In some example, the first lenses 123 and 133 of the first and second lens groups 122 and 132 are formed of a lower reflective index, high Abbe value material, such as a Crown material having an index of refraction between 1.4 and 1.65, and an Abbe value between 45 and 85. In examples, the second lenses 124 and 134 of the first and second lens groups 122 and 132 are formed of a higher refractive index, low Abbe value material, such as a Flint material having an index of refraction between 1.65 and 1.95, and an Abbe value between 10 and 45.

The lens assembly 120 may be modified as needed in various applications. For example, in embodiments, instead of having two lenses the second lens group 132 may include a single lens, or three lenses configured to correct for optical field curvature and distortions.

The lens assembly 120 has a back focal distance 140 that is the distance from the second surface 134*b* of the second lens 134 of the second lens group 132 to the image sensor 112. Imaging systems that employ small area sensors, such as the sensor 112, require active alignment of the sensor 112 to achieve high levels of image resolution for processing of images such as images of a barcode. Active alignment of the imaging sensor 112 requires that the back focal length 140 be greater than tens of microns to ensure that the image sensor 112 does not physically contact the second surface 134*b* of the second lens 134 of the second lens group 132, potentially causing damage, or scratching the second surface 134*b*. Additionally, an increased back focal length 140 allows for additional elements to be added to the front of the imagine sensor 112 such as a cover glass, chromatic filter, dispersion correction element, diffuser, or other optical element. Further, any blurring or distortion of an image due to dust, dirt, or minor incongruities of the lenses may be mitigated by back focal distances greater than tens of millimeters due to a blurring effect of the distortions over larger back focal lengths 140. In embodiments described herein, the back focal distance may be 0.5 millimeters, 1 millimeter, 1.5 millimeters, or approximately 2 millimeters. In embodiments, the back focal distance is equal to or greater than 0.5 millimeters.

In embodiments described herein, the lens assembly has an overall focal length of approximately 4 millimeters, and an f-number equal to or greater than 5. The lens assembly 120 has a reduced overall focal length with an increased back focal length 140 compared to other lens assemblies.

In embodiments, the lens assembly 120 may be fabricated by positioning the lenses into the lens holder from the side of the lens holder opposite the front aperture 114. The ability to assemble the lens assembly 120 from a single side of the lens holder 121 simplifies fabrication of the lens assembly 120 and may assist in enabling mass production of the lens assembly 120.

In embodiments, the imaging sensor 112 may be a charge coupled device, or another solid-state imaging device. The imaging sensor 112 may be a one megapixel sensor with pixels of approximately three microns in size.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An optical assembly for wide angle imaging of an object of interest, the optical assembly comprising:
    a front aperture disposed along an optical axis configured to receive light from the object of interest therethrough along the optical axis;
    a first lens group disposed along the optical axis relative to the front aperture to receive the light from the object of interest through the front aperture and configured to correct for spherical aberrations of an image projected by a second lens group onto an imaging sensor;
    a glass lens disposed along the optical axis configured to receive the light from the first lens group, the glass lens having a first flat surface and a second spherical surface opposite the first flat surface disposed along the optical axis, the glass lens being a Crown type glass having a positive optical power;
    the second lens group disposed along the optical axis configured to receive the light from the glass lens and further configured to correct for optical field distortions and aberrations of the image projected by the second lens group; and
    the imaging sensor being disposed along the optical axis at a back focal distance of the second lens group, and configured to receive the image from the second lens group and to generate an electrical signal indicative of the image, wherein the back focal distance is equal to or greater than 0.5 millimeters in proximity to the imaging sensor,
    wherein the first lens group comprises a first plastic aspheric lens and a second plastic aspheric lens, the first plastic aspheric lens of the first lens group disposed along the optical axis between the second plastic aspheric lens and the aperture, and
    wherein the second lens group comprises a first plastic aspheric lens and a second plastic aspheric lens, the first plastic aspheric lens of the second lens group is disposed along the optical axis between the second plastic aspheric lens and the glass lens.

2. The optical assembly of claim 1, wherein the imaging sensor is a solid-state imager.

3. The optical assembly of claim 1, wherein the second lens group configured to correct for optical field distortions is configured to correct for at least one of field curvature, astigmatism, coma, or chromatic aberrations.

4. The optical assembly of claim 1, wherein the optical assembly has an effective focal length of approximately 4 millimeters, and an f-number of greater than 5.

5. The optical assembly of claim 1, wherein the first plastic aspheric lens of the first lens group has a first aspheric surface along the optical axis and a second aspheric surface opposite the first aspheric surface of the first plastic aspheric lens of the first lens group disposed along the optical axis, and wherein the first plastic aspheric lens of the first lens group is formed of a Crown type plastic having a positive optical power, and the second plastic aspheric lens of the first lens group has a first aspheric surface along the optical axis and a second aspheric surface along the optical axis, and wherein the second plastic aspheric lens of the first lens group is formed of a Flint type material having a negative optical power.

6. The optical assembly of claim 1, wherein the first plastic aspheric lens of the second lens group has a first aspheric surface along the optical axis and a second aspheric surface opposite the first aspheric surface of the first plastic aspheric lens of the second lens group disposed along the optical axis, wherein the first plastic aspheric lens of the second lens group is formed of a Crown type plastic having a positive optical power, and wherein the second plastic aspheric lens of the second lens group is formed of a Flint type material having a negative optical power.

7. The optical assembly of claim 1, wherein the second lens group comprises three aspheric plastic lenses.

8. The optical assembly of claim 1, further comprising a lens holder with a front window, the lens holder configured to hold the aperture, the first lens group, glass lens, and the second lens group in position along the optical axis to provide the image to the imaging sensor.

9. The optical assembly of claim 1, further comprising an illumination system configured to illuminate a target for imaging of the target.

\* \* \* \* \*